US012509740B2

(12) United States Patent
De Knijf et al.

(10) Patent No.: US 12,509,740 B2
(45) Date of Patent: Dec. 30, 2025

(54) HOT ROLLED AND STEEL SHEET AND A METHOD OF MANUFACTURING THEREOF

(71) Applicant: ArcelorMittal, Luxembourg (LU)

(72) Inventors: Dorien De Knijf, Denderhoutem Oost-Vlaanderen (BE); Lode Duprez, Gentbrugge (BE); Koenraad Theuwissen, Berchem (BE); Tom Waterschoot, Lokeren (BE)

(73) Assignee: ArcelorMittal, Luxembourg (LU)

( * ) Notice: Subject to any disclaimer, the term of this patent is extended or adjusted under 35 U.S.C. 154(b) by 685 days.

(21) Appl. No.: 17/783,926

(22) PCT Filed: Dec. 15, 2020

(86) PCT No.: PCT/IB2020/061955
§ 371 (c)(1),
(2) Date: Jun. 9, 2022

(87) PCT Pub. No.: WO2021/124094
PCT Pub. Date: Jun. 24, 2021

(65) Prior Publication Data
US 2023/0058956 A1   Feb. 23, 2023

(30) Foreign Application Priority Data

Dec. 17, 2019   (WO) .................. PCT/IB2019/060890

(51) Int. Cl.
| | | |
|---|---|---|
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| *C22C 38/60* | (2006.01) | |

(52) U.S. Cl.
CPC ......... *C21D 8/0226* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C21D 2211/001* (2013.01); *C21D 2211/008* (2013.01)

(58) Field of Classification Search
None
See application file for complete search history.

(56) References Cited

U.S. PATENT DOCUMENTS

| | | |
|---|---|---|
| 2006/0011274 A1 | 1/2006 | Speer et al. |
| 2010/0221573 A1 | 9/2010 | Drillet et al. |
| 2014/0377584 A1 | 12/2014 | Hasegawa et al. |
| 2015/0027593 A1 | 1/2015 | Hata et al. |
| 2018/0171429 A1* | 6/2018 | Suwa ..................... C22C 38/04 |
| 2019/0106760 A1 | 4/2019 | Yamashita et al. |
| 2019/0233910 A1 | 8/2019 | Ryu et al. |
| 2019/0276907 A1 | 9/2019 | Yamashita et al. |
| 2019/0284656 A1 | 9/2019 | Kawasaki et al. |
| 2019/0338385 A1 | 11/2019 | Pipard et al. |
| 2019/0338388 A1 | 11/2019 | Pipard et al. |
| 2020/0071785 A1 | 3/2020 | Ahrenhold et al. |
| 2020/0095657 A1 | 3/2020 | Pipard et al. |
| 2020/0190612 A1 | 6/2020 | Kwak et al. |
| 2021/0115528 A1 | 4/2021 | Magar et al. |

FOREIGN PATENT DOCUMENTS

| | | |
|---|---|---|
| CN | 110088320 A | 8/2019 |
| CN | 110088332 A | 8/2019 |
| CN | 110088342 A | 8/2019 |
| EP | 2392682 A1 | 12/2011 |
| EP | 2789699 | 10/2014 |
| EP | 2871254 A1 | 5/2015 |
| EP | 3282030 A1 | 2/2018 |
| JP | 2012031462 A | 2/2012 |
| JP | 2017048412 A | 3/2017 |
| JP | 2018059188 A | 4/2018 |
| JP | 2019535895 A | 12/2019 |
| JP | 2020509161 A | 3/2020 |
| KR | 20140129220 A | 11/2014 |

(Continued)

OTHER PUBLICATIONS

ISR of PCT/IB2020/061955 dated Jan. 21, 2021.
Written opinion of ISA of PCT/IB2020/061955.

*Primary Examiner* — Anthony M Liang
(74) *Attorney, Agent, or Firm* — Davidson Kappel LLC

(57) ABSTRACT

A hot rolled steel sheet having a composition including the following elements, 0.18%≤Carbon≤0.3%, 1.8%≤Manganese≤4.5%. 0.8%≤Silicon≤2%, 0 001%≤Aluminum≤0.2%, 0.1%≤Molybdenum≤1%, 0.001%≤Titanium≤0.2%, 0.0001%≤Boron≤0.01%, 0%≤Phosphorus≤0.09%, 0%≤Sulfur≤0.09%, 0%≤Nitrogen≤0.09%, 0%≤Chromium≤0.5%, 0%≤Niobium≤0.1%, 0%≤Vanadium≤0.5%, 0%≤Nickel≤1%, 0%≤Copper≤1%, 0%≤Calcium≤0.005%, 0%≤Magnesium≤0.0010% the remainder composition being composed of iron and unavoidable impurities caused by processing, the microstructure of said steel sheet including in area fraction, of at least 70% martensite, 8% to 25% residual austenite, wherein the shape factor of the residual austenite is between 4 and 12.

18 Claims, No Drawings

(56) References Cited

FOREIGN PATENT DOCUMENTS

| KR | 20190072596 A | 6/2019 |
| WO | WO2017183348 A1 | 10/2017 |
| WO | WO2017183349 A1 | 10/2017 |
| WO | WO2018055425 A1 | 3/2018 |
| WO | WO2018110867 A1 | 6/2018 |

\* cited by examiner

HOT ROLLED AND STEEL SHEET AND A METHOD OF MANUFACTURING THEREOF

The present invention relates to hot rolled steel sheet suitable for use as structural steel or for manufacturing industrial machinery, yellow goods and green goods.

BACKGROUND

In recent years, efforts have been actively made to reduce the weight of the equipment and structure by applying high-strength steel sheets for the purpose of improving fuel efficiency as well as reducing the environmental impact. However, when the strength of the steel sheet is increased, the toughness generally deteriorates. Therefore, in the development of high-strength steel, it is an important issue to increase the strength without deteriorating the toughness.

Intense Research and development endeavors are undertaken to reduce the amount of material utilized by increasing the strength of material. Conversely, an increase in strength of steel sheets decreases toughness, and thus development of materials having both high strength and good toughness is necessitated.

Earlier research and developments in the field of high strength and good toughness steel have resulted in several methods for producing high strength steel, some of which are enumerated herein for conclusive appreciation of the present invention:

Patent publication US2006/0011274 A1 discloses a relatively new process called quenching and partitioning (Q&P) which enables the production of steels with microstructures containing retained austenite. This known quenching and partitioning process consists of a two-step heat treatment. After reheating in order to obtain either a partially or fully austenitic microstructure, the steel is quenched to a suitable predetermined temperature between the martensite start (Ms) and finish (Mf) temperatures. The desired microstructure at this quench temperature (QT) consists of ferrite, martensite and untransformed austenite or martensite and untransformed austenite. In a second partitioning treatment step, the steel is either held at the QT or brought to a higher temperature, the so-called partitioning temperature (PT), i.e., PT QT. The aim of the later step is to enrich the untransformed austenite with carbon through depletion of the carbon supersaturated martensite. In the Q&P process, formation of iron carbides or bainite is intentionally suppressed, and the retained austenite is stabilized to get the advantage of strain-induced transformation during subsequent forming operations. The above developments were intended to improve the mechanical and forming related properties of thin sheet steels to be used in automotive applications. In such applications, good impact toughness is not required and strengths are limited to below 1000 MPa.

EP2789699 is a patent application which discloses a method of manufacturing a hot-rolled steel product, such as a hot-rolled steel strip or plate product, having Brinell hardness of at least 450 HBW. The method comprises the following steps in given sequence: a step of providing a steel slab containing, in terms of weight percentages, C: 0.25-0.45%, Si: 0.01-1.5%, Mn: 0.4-3.0%, Ni: 0.5-4.0%, Al: 0.01-1.2%, Cr: less than 2.0%, Mo: less than 1.0%, Cu: less than 1.5%, V: less than 0.5%, Nb: less than 0.2%, Ti: less than 0.2%, B: less than 0.01%, Ca: less than 0.01%, the balance being iron, residual contents and unavoidable impurities; a heating step of heating the steel slab to a temperature Treat in the range 950-1350° C.; a temperature equalizing step; a hot-rolling step in a temperature range of Ar3 to 1300° C. to obtain a hot-rolled steel material; and a step of direct quenching the hot-rolled steel material from the hot-rolling heat to a temperature of less than Ms. The prior austenite grain structure of the obtained steel product is elongated in the rolling direction so that the aspect ratio is greater than or equal to 1.2. But EP2789690 is unable to provide the total elongation of 15% while having a tensile strength of 1000 MPa.

SUMMARY OF THE INVENTION

It is an object of the present disclosure to provide a hot-rolled steel that simultaneously has:
- a yield strength 850 MPa or more and preferably 880 Mpa or more,
- a total elongation greater than or equal to 15% and preferably greater than or equal to 15.5%.
- an impact toughness of greater than or equal to 30 J/cm2 when measured at −40° C. and preferably greater than or equal to 35 J/cm2 when measured at −40° C.

In a preferred embodiment, the steel sheets according to the invention present a hardness greater than or equal to 395 BHN and preferably greater than or equal to 410 BHN In a preferred embodiment, the steel sheets according to the invention may also present a tensile strength greater than or equal to 1150 MPa.

In a preferred embodiment, the steel sheets according to the invention may also present a yield strength to tensile strength ratio of 0.5 or more Preferably, such steel can also have a good suitability for forming, in particular for rolling with good weldability.

Another object of the present invention is also to make available a method for the manufacturing of these sheets that is compatible with conventional industrial applications while being robust towards manufacturing parameters shifts.

DETAILED DESCRIPTION

The hot rolled steel sheet of the present invention may optionally be coated with zinc or zinc alloys, to improve its corrosion resistance.

Carbon is present in the steel between 0.18% and 0.3%. Carbon is an element necessary for increasing the strength as well as hardness of the steel by assisting the tempered martensite formation. But Carbon content less than 0.18% will not be able to impart the tensile strength to the steel of present invention. On the other hand, at a Carbon content exceeding 0.3%, the steel exhibits poor spot weldability as well as it is detrimental for the impact toughness which limits its application for the structural parts of yellow or green goods. A preferable content for the present invention may be kept between 0.19% and 0.28%, and more preferably between 0.19% and 0.25%.

Manganese content of the steel of present invention is between 1.8% and 4.5%.

This element is gammagenous and therefore plays an important role in controlling the Residual Austenite fraction. The purpose of adding Manganese is essentially to impart hardenability to the steel. An amount of at least 1.8% by weight of Manganese has been found in order to provide the strength and hardenability to the steel. But when Manganese content is more than 4.5% it produces adverse effects such as it retards transformation of Austenite during the cooling after hot rolling. In addition, the Manganese content of above 4.5% it promotes the central segregation hence reduces the formability and also deteriorates the weldability of the present steel. A preferable content for the present invention may be kept between 1.9% and 4.2% and more preferably 2% and 4%.

Silicon content of the steel of the present invention is between 0.8% and 2%. Silicon is solid solution strengthener for the steel of the present invention. In addition, Silicon retards the precipitation of Cementite and also prevents the formation of carbides while often cannot completely eliminate carbide formation. Hence assists in the formation of Residual austenite at room temperature. However, a content of silicon more than 2% leads to a problem such as surface defects like tiger strips which adversely effects the steel of the present invention. Therefore, the concentration is controlled within an upper limit of 2%. A preferable content for the present invention may be kept between 0.9% and 1.9% and more preferably between 1% and 1.8%.

Aluminum is an element that is present in the steel of the present invention between 0.001% and 0.2%. Aluminum is an alphagenous element and imparts ductility to steel of present invention. Aluminum in the steel has a tendency to bond with nitrogen to form aluminum nitride hence from point of view of the present invention the Aluminum content must be kept as low as possible and preferably between 0.02% and 0.06%.

Molybdenum is an essential element that constitutes 0.1% to 1% of the steel of the present invention. Molybdenum increases the hardenability and toughness of the steel of the present invention by influencing the formation of film-like austenite. A minimum of 0.1% of Molybdenum is required to assist in the formation of film like austenite and film like tempered martensite. However, the addition of Molybdenum excessively increases the cost of the addition of alloy elements, so that for economic reasons its content is limited to 1%. Preferable limit for molybdenum is between 0.15% and 0.7% and more preferably between 0.15% and 0.6%.

Titanium is an essential element and present between 0.001% and 0.2% in the steel of the present invention. Titanium imparts the steel of the present invention with the strength by forming carbide. But whenever Titanium is present more than 0.2% it imparts excess strength and hardness to the steel of the present invention which diminishes the toughness beyond the targeted limits. The preferable limit for titanium is between 0.001% and 0.15% and more preferred limit is 0.001% and 0.1%.

Phosphorus constituent of the steel of the present invention is between 0% and 0.09%. Phosphorus reduces the spot weldability, the hot ductility and toughness, particularly due to its tendency to segregate at the grain boundaries or co-segregate with manganese. For these reasons, its content is limited to 0.02% and preferably lower than 0.015%.

Sulfur is not an essential element but may be contained as an impurity in steel and from point of view of the present invention the Sulfur content is preferably as low as possible, but is 0.09% or less from the viewpoint of manufacturing cost. Further if higher Sulfur is present in steel it combines to form Sulfides especially with Manganese and reduces its beneficial impact on the steel of the present invention, and therefore is preferred below 0.003%

Nitrogen is limited to 0.09% in order to avoid ageing of material. Nitrogen forms the nitrides which impart strength to the steel of the present invention by precipitation strengthening with Vanadium and Niobium but whenever the presence of nitrogen is more than 0.09% it can form high amount of Aluminum Nitrides which are detrimental for the present invention. Hence the preferable upper limit for nitrogen is 0.01% and more preferably 0.005%.

In a preferred embodiment it is preferred to have a cumulative presence of carbon and Manganese between 2.3% and 4.5%.

Boron is an optional element to the steel of present invention and may be present between 0.0001% and 0.01%. Boron imparts strength to the steel of present invention by forming carbides and nitrides.

Chromium is an optional element for the present invention. Chromium content may be present in the steel of the present invention is between 0% and 0.5%. Chromium is an element that provides hardenability to the steel but content of Chromium higher than 0.5% leads to central co-segregation similar to Manganese.

Vanadium is an optional element that may be present between 0% and 0.5% of the steel of the present invention. Vanadium is effective in enhancing the strength of steel by forming carbides, nitrides or carbo-nitrides and the upper limit is 0.5% due to economic reasons. These carbides, nitrides or carbo-nitrides are formed during the cooling after hot rolling. Preferable limit for Vanadium is between 0.15% and 0.4% and more preferably 0.15% and 0.3%.

Niobium is an optional element for the present invention. Niobium content may be present in the steel of present invention between 0% and 0.1% and is added in the steel of present invention for forming carbides or carbo-nitrides to impart strength to the steel of present invention by precipitation strengthening. Preferable limit is between 0% and 0.05%

Nickel may be added as an optional element in an amount of 0% to 1% to increase the strength of the steel of the present invention and to improve its toughness. A minimum of 0.01% is preferred to get such effects. However, when its content is above 1%, Nickel causes ductility deterioration.

Copper may be added as an optional element in an amount of 0% to 1% to increase the strength of the of Steel of the present invention and to improve its corrosion resistance. A minimum of 0.01% is preferred to get such effects. However, when its content is above 1%, it can degrade the surface aspects.

Calcium content in the steel of the present invention is below 0.005%. Calcium is added to steel of the present invention in a preferable amount of 0.0001 to 0.005% as an optional element especially during the inclusion treatment, thereby, retarding the harmful effects of Sulfur.

Other elements such as, Magnesium can be added in the following proportions by weight Magnesium≤0.0010%. Up to the maximum content levels indicated, these elements make it possible to refine the grain during solidification.

The remainder of the composition of the Steel consists of iron and inevitable impurities resulting from processing.

The microstructure of the Steel sheet comprises:

The shape factor for the purpose of the present invention is the ratio of the major axis and minor axis of the microstructural constituent (also called aspect ratio) and it is a unit less number.

Martensite is present in the steel of the present invention in at least 70% wherein the martensite of present invention is comprised of tempered martensite and fresh martensite wherein tempered Martensite is the matrix phase for the steel of the present invention. The tempered martensite of the steel of the present invention has a film-like structure and is not particularly limited, though it is preferred that its shape ratio between 4 and 12 preferably and more preferably between 5 and 11. Tempered martensite is formed from the martensite which forms during the cooling after annealing. Such martensite is then tempered during the holding at partitioning temperature. The tempered martensite of the steel of present invention imparts ductility and strength. It is preferred that the content of tempered martensite is more than 70% and more preferably more than 75% by area fraction of total microstructure. Fresh martensite can also be optionally present in the steel of present invention. Fresh martensite may form during cooling after partitioning step from remaining unstable residual austenite. Fresh martensite can be present between 0% an 15%, preferably between 0 and 10% and even better no fresh martensite is present. The shape ratio of such fresh martensite is between 4 and 12 and more preferably 5 and 11.

Residual Austenite is an essential microstructural constituent of the steel of present invention and is present between 8% and 25%. Residual Austenite of the present imparts toughness to the steel of the present invention. The Residual Austenite of the steel of the present invention is film type austenite having a shape factor between 4 and 12 and preferably between 5 and 11. Residual austenite of the present invention is present between the laths of the tempered martensite or the films of fresh martensite. The films of the residual austenite preferably have a thickness between 15 nanometer and 120 nanometers. The residual austenite is formed during the partitioning step. The preferred presence of residual austenite for the present invention is between 8% and 22% and more preferably between 9% and 18%.

In addition to the above-mentioned microstructure, the microstructure of the hot rolled steel sheet is free from microstructural components, such as Pearlite, Ferrite, Bainite and Cementite. Carbides of alloying elements might be present in the steel of present invention between 0% and 5% such as of Mo, Fe and others while these carbides are not desired as such since the formation of carbides consume partly the amount of Carbon, which is detrimental for the stabilization of residual austenite.

A hot rolled steel sheet according to the invention can be produced by any suitable method. A preferred method consists in providing a semi-finished casting of steel with a chemical composition according to the invention. The casting can be done either into ingots or continuously in form of thin slabs or thin strips, i.e. with a thickness ranging from approximately 220 mm for slabs up to several tens of millimeters for thin strip.

For example, a slab having the above-described chemical composition is manufactured by continuous casting wherein the slab optionally underwent the direct soft reduction during the continuous casting process to avoid central. The slab provided by continuous casting process can be used directly at a high temperature after the continuous casting or may be first cooled to room temperature and then reheated for hot rolling.

The slab is reheated to a temperature between at least Ac3+50° C. and 1300° C. In case the temperature of the slab is lower than least Ac3+50° C., excessive load is imposed on a rolling mill. Therefore, the temperature of the slab is sufficiently high so that hot rolling can be completed fully in the austenitic range. Reheating at temperatures above 1300° C. must be avoided because it causes productivity loss and is also industrially expensive. Therefore, the preferred reheating temperature is between least Ac3+100° C. and 1280° C.

Hot rolling finishing temperature for the present invention is at least Ac3 and preferably between Ac3 and Ac3+100° C., more preferably between 840° C. and 980° C. and even more preferably between 850° C. and 930° C.

The hot rolled strip obtained in this manner is then cooled from hot roll finishing temperature to a temperature range between Ms and 20° C. at a cooling rate between 10° C./s and 200° C./s. In a preferred embodiment, the cooling rate for this step of cooling is between 20° C./s and 180° C./s and more preferably between 50° C./s and 150° C./s.

Then the hot rolled strip may optionally be coiled wherein coiling temperature is between 20° C. and 450° C.

Thereafter the hot rolled steel strip is being heat treated which will impart the steel of the present invention with requisite mechanical properties and microstructure.

The hot rolled steel strip is being heated from a temperature between Ms–50° C. to 20° C. up to the annealing temperature Tsoak which is between Ac3 and Ac3+250° C., preferably between Ac3+10° C. and Ac3+200° C., such heating being performed at a heating rate HR1 of at least 1° C./s.

The hot rolled steel strip is held at Tsoak during 5 seconds to 1000 seconds to ensure a complete recrystallization and full transformation to austenite of the work hardened initial structure.

Then, the hot rolled steel strip is then cooled wherein the cooling starts from Tsoak at a cooling rate CR1 between 0.1° C./s and 150° C./s, to a cooling stop temperature T1 which is in a range between Ms–10° C. and 50° C. In a preferred embodiment, the cooling rate CR1 for such cooling is between 0.1° C./s and 120° C./s. The preferred T1 temperature is between Ms–10° C. and 100° C. Cooling rate for cooling after soaking must be sufficiently high to avoid the transformation of Austenite into Bainite so that a sufficient amount of carbon is available for stabilizing the film-like residual austenite during the partitioning step. During this step the Austenite is transformed to martensite especially after crossing the Ms temperature.

Thereafter, the hot rolled steel strip is brought to a partitioning temperature Tpartition which is between Ms+150° C. and Ms–150° C. and the hot rolled steel strip is held at Tpartition during 5 s to 1000 s. The preferred temperature range for Tpartition is between Ms+100° C. and Ms–100° C. and the preferred duration for holding at Tpartition is between 200 s and 1000 s and more preferably between 400 s and 1000 s. During this step the carbon from the martensite is partitioned and consumed by Austenite for stabilization at room temperature. The time of holding the hot rolled strip at partitioning temperature is preferably selected so that the residual austenite has an average presence of Carbon in austenite of at least 0.9%.

Then, the hot rolled steel strip is cooled down to room temperature at a cooling rate CR2 between 0.1° C./s and 10° C./s and preferably between 0.1° C./s and 5° C./s to obtain a hot rolled steel sheet. During this cooling the fresh martensite may form from some remaining ubstable austenite. The hot rolled steel sheet thus obtained preferably has a thickness between 2 mm and 25 mm and more preferably between 2 mm and 20 mm and even more preferably between 4 mm and 15 mm.

Examples

The following tests, examples, figurative exemplification and tables which are presented herein are non-restricting in nature and must be considered for purposes of illustration only, and will display the advantageous features of the present invention.

Steel sheets made of steels with different compositions are gathered in Table 1, where the steel sheets are produced according to process parameters as stipulated in Table 2, respectively. Thereafter Table 3 gathers the microstructures of the steel sheets obtained during the trials and table 4 gathers the result of evaluations of obtained properties.

Ac3 is calculated by using the following formula:

$$Ac3=910-203[C]^{(1/2)}-15.2[Ni]+44.7[Si]+104[V]+ 31.5[Mo]+13.1[W]-30[Mn]-11[Cr]-20[Cu]+ 700[P]+400[Al]+120[As]+400[Ti]$$

Ms is calculated by using the following formula:

$$Ms = 545 - 601.2 * (1 - EXP(-0.868[C])) - 34.4[Mn] - 13.7[Si] -$$
$$9.2[Cr] - 17.3[Ni]$$
$$-15.4[Mo] + 10.8[V] + 4.7[Co] - 1.4[Al] - 16.3[Cu] - 361[Nb]$$
$$-2.44[Ti] - 3448[B]$$

wherein the elements contents are expressed in weight percentage of the hot rolled steel sheet.

TABLE 1

| Steels | C | Mn | Si | Al | Mo | Ti | B | P | S | N | Cr | Nb | V | Ni | Cu | Ac3 | Ms |
|---|---|---|---|---|---|---|---|---|---|---|---|---|---|---|---|---|---|
| A | 0.21 | 3.92 | 1.48 | 0.056 | 0.21 | 0.030 | 0.0020 | 0.005 | 0.0027 | 0.003 | 0.009 | 0 | 0.0030 | 0 | 0.007 | 770 | 311 |
| B | 0.19 | 2.20 | 1.50 | 0.015 | 0.37 | 0.002 | 0.0002 | 0.003 | 0.0015 | 0.005 | 0.210 | 0.004 | 0.0040 | 0.008 | 0.019 | 825 | 369 |
| C | 0.24 | 2.19 | 1.48 | 0.022 | 0.20 | 0.001 | 0.0003 | 0.003 | 0.0020 | 0.001 | 0.201 | 0.055 | 0.0050 | 0.005 | 0.011 | 820 | 349 |
| D | 0.21 | 3.93 | 1.44 | 0.03 | <u>0.006</u> | 0.034 | 0.0025 | 0.002 | 0.0020 | 0.003 | 0.009 | 0 | 0.0040 | 0 | 0.006 | 766 | 313 |
| E | 0.20 | 2.13 | 1.43 | 0.03 | <u>0.003</u> | 0.006 | 0 | 0.003 | 0.0080 | 0.002 | 0.210 | 0.009 | 0.0009 | 0.004 | 0.011 | 820 | 368 |
| F | 0.24 | 2.16 | 1.48 | 0.02 | <u>0.003</u> | 0.001 | 0.0030 | 0.003 | 0.0010 | 0.002 | 0.200 | 0.063 | 0.0061 | 0.005 | 0.011 | 816 | 353 |

I = according to the invention; R = reference; underlined values: not according to the invention.

TABLE 2

Table 2 gathers the process parameters implemented on steels of Table 1.

| | | | Cooling | | | | | Annealing | | | Partitioning | | | |
|---|---|---|---|---|---|---|---|---|---|---|---|---|---|---|
| Trials | Steel | Re-heating T (° C.) | HR Finish T(° C.) | rate after HR (° C./s) | Cooling stop T (° C.) | HR1 (° C./S) | Soaking T (° C.) | Soaking time (sec) | T1 (° C.) | CR1 (° C./s) | Tpar-tition (° C.) | Holding time (s) | CR2 (° C./S) | Cooling stop T (° C.) |
| I1 | A | 1250 | 850 | 129 | 25 | 1.62 | 830 | 480 | 130 | 0.44 | 400 | 480 | 0.1 | 25 |
| I2 | B | 1250 | 850 | 143 | 25 | 1.96 | 850 | 900 | 250 | 26 | 400 | 480 | 0.5 | 25 |
| I3 | C | 1250 | 900 | 117 | 25 | 2 | 850 | 480 | 215 | 30 | 300 | 900 | 0.23 | 25 |
| R1 | D | 1250 | 850 | 91 | 25 | 1.48 | 826 | 480 | 130 | 0.45 | 400 | 480 | 0.4 | 25 |
| R2 | <u>E</u> | 1250 | 850 | 104 | 25 | 1.93 | 851 | 900 | 230 | 109 | 400 | 480 | 0.28 | 25 |
| R3 | <u>F</u> | 1250 | 900 | 124 | 25 | 1.83 | 857 | 480 | 215 | 25 | 300 | 900 | 0.33 | 25 |

I = according to the invention; R = reference; underlined values: not according to the invention.

TABLE 3

Table 3 exemplifies the results of the tests conducted in accordance with the standards on different microscopes such as Scanning Electron Microscope or X-ray Diffraction for determining the microstructures of both the inventive and reference steels. The results are stipulated herein:

| Trials | Martensite (%) | Residual Austenite (%) | Shape factor of Residual Austenite r |
|---|---|---|---|
| I1 | 84 | 16 | 5.6 |
| I2 | 90 | 10 | 6.0 |
| I3 | 88 | 12 | 5.6 |
| R1 | 84 | 16 | <u>2.6</u> |
| R2 | 93 | <u>7</u> | <u>3.7</u> |
| R3 | 89 | <u>11</u> | <u>2.1</u> |

I = according to the invention; R = reference; underlined values: not according to the invention.

TABLE 4

Table 4 exemplifies the mechanical properties of both the inventive steel and reference steels. In order to determine the tensile strength, yield strength and total elongation, tensile tests are conducted in accordance of NBN EN ISO6892-1 standards with tensile samples having A25. The toughness is tested by a Charpy test performed according to ISO 148-1. The results of the various mechanical tests conducted in accordance to the standards are gathered

| Trials | Yield Strength (MPa) | Total Elongation (%) | Toughness(J/cm2) | Tensile Strength(MPa) | Hardness (BHN) |
|---|---|---|---|---|---|
| I1 | 1145 | 15.5 | 36 | 1291 | 473 |
| I2 | 1011 | 16.9 | 59 | 1200 | 415 |
| I3 | 886 | 17.9 | 59 | 1216 | 422 |
| R1 | 1184 | 16.6 | <u>16</u> | 1325 | 480 |
| R2 | <u>827</u> | 16.6 | 41 | 1116 | 275 |
| R3 | 981 | <u>14.4</u> | 39 | 1281 | 390 |

I = according to the invention; R = reference; underlined values: not according to the invention.

What is claimed is:

1. A hot rolled steel sheet having a composition comprising the following elements, expressed in percentage by weight:
0.18%≤carbon≤0.3%
1.8%≤manganese≤4.5%
0.8%≤silicon≤2%
0.001%≤aluminum≤0.2%
0.1%≤molybdenum≤1%
0.001%≤titanium≤0.2%
0%≤phosphorus≤0.09%
0%≤sulfur≤0.09%
0%≤nitrogen≤0.09%
and optionally one or more of the following elements
0.0001%≤boron≤0.01%
0%≤chromium≤0.5%
0%≤niobium≤0.1%
0%≤vanadium≤0.5%
0%≤nickel≤1%
0%≤copper≤1%
0%≤calcium≤0.005%
0%≤magnesium≤0.0010%
a remainder of the composition being composed of iron and unavoidable impurities caused by processing, a microstructure of the steel sheet comprising in area fraction, of at least 70% martensite, 8% to 25% residual austenite, wherein a shape factor of the residual austenite is between 4 and 12.

2. The hot rolled steel sheet as recited in claim 1, wherein the composition includes 0.9% to 1.9% of silicon.

3. The hot rolled steel sheet as recited in claim 1, wherein the composition includes 0.19% to 0.28% of carbon.

4. The hot rolled steel sheet as recited in claim 3, wherein the composition includes 0.001% to 0.15% of titanium.

5. The hot rolled steel sheet as recited in claim 1, wherein the composition includes 1.9% to 4.2% of manganese.

6. The hot rolled steel sheet as recited in claim 1, wherein the composition includes 0.15% to 0.7% of molybdenum.

7. The hot rolled steel sheet as recited in claim 1, wherein the composition includes 0.02% to 0.06% of aluminum.

8. The hot rolled steel sheet as recited in claim 1, wherein a cumulative presence of carbon and manganese is between 2.3% and 4.5%.

9. The hot rolled steel sheet as recited in claim 1, wherein the amount of residual austenite is between 8% and 22%.

10. The hot rolled steel sheet as recited in claim 1, wherein the steel sheet has a yield strength of 850 MPa or more, and a total elongation of 15% or more.

11. The hot rolled steel sheet as recited in claim 10, wherein said steel sheet has a yield strength of 880 MPa or more.

12. The hot rolled steel sheet as recited in claim 1, wherein the shape factor of the tempered martensite and residual austenite is between 5 and 11.

13. A method of production of a hot rolled steel sheet comprising the following successive steps:
providing a semi-finished product having a composition comprising the following elements, expressed in percentage by weight:
0.18%≤carbon≤0.3%
1.8%≤manganese≤4.5%
0.8%≤silicon≤2%
0.001%≤aluminum≤0.2%
0.1%≤molybdenum≤1%
0.001%≤titanium≤0.2%
0%≤phosphorus≤0.09%
0%≤sulfur≤0.09%
0%≤nitrogen≤0.09%
and optionally one or more of the following elements
0.0001%≤boron≤0.01%
0%≤chromium≤0.5%
0%≤niobium≤0.1%
0%≤vanadium≤0.5%
0%≤nickel≤1%
0%≤copper≤1%
0%≤calcium≤0.005%
0%≤magnesium≤0.0010%
a remainder of the composition being composed of iron and unavoidable impurities caused by processing;
reheating the semi-finished product to a temperature between $Ac3+50°$ C. and 1300° C.;
rolling the semi-finished product in the austenitic range wherein a hot rolling finishing temperature is at least Ac3 to obtain a hot rolled steel strip;
optionally coiling the hot rolled steel strip at a coiling temperature range is between 200° C. and 450° C.;
then cooling the hot rolled strip from the hot rolling finishing temperature to a temperature range between Ms and 20° C., with a cooling rate between 10° C./s and 200° C./s;
then heating the hot rolled strip from a temperature range between Ms−50° C. and 20° C. to a temperature Tsoak between Ac3 and Ac3+250° C., with a heating rate HR1 of at least 1° C./s, and holding for 5 to 1000 seconds
then cooling the hot rolled strip, wherein cooling starts from Tsoak to a cooling stop temperature T1 between Ms−10° C. and 50° C., with a cooling rate CR1 between 0.1° C./s and 150° C./s;
then bringing the hot rolled strip from T1 to a partitioning temperature Tpartition between Ms−150° C. and Ms+150° C. wherein the hot rolled steel strip is held for 5 s to 1000 s;
thereafter cooling the hot rolled steel strip to room temperature at a cooling rate CR2 between 0.1° C./s and 10° C./s to obtain the hot rolled steel sheet as recited in claim 1.

14. The method as recited in claim 13, wherein the hot rolling finishing temperature is between 840° C. and 980° C.

15. The method as recited in claim 13, wherein the cooling rate for cooling after hot rolling is between 20° C./s and 180° C./s.

16. The method as recited in claim 13, wherein the Tpartition temperature is between Ms+100° C. and Ms−100° C.

17. A method for the manufacture of a part of industrial machinery or green goods or yellow goods comprising performing the method as recited in claim 13.

18. A method for the manufacture of a part of industrial machinery or green goods or yellow goods comprising employing the steel sheet as recited in claim 1.

* * * * *